United States Patent
Doan et al.

(10) Patent No.: US 7,359,941 B2
(45) Date of Patent: Apr. 15, 2008

(54) METHOD AND APPARATUS FOR FILTERING SPAM EMAIL

(75) Inventors: Christopher Hoang Doan, Austin, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 10/753,819

(22) Filed: Jan. 8, 2004

(65) Prior Publication Data
US 2005/0188023 A1 Aug. 25, 2005

(51) Int. Cl.
*G06F 15/16* (2006.01)
(52) U.S. Cl. .............. 709/205; 709/206; 709/207
(58) Field of Classification Search ........... 709/206, 709/207, 205
See application file for complete search history.

(56) References Cited

U.S. PATENT DOCUMENTS

| | | | |
|---|---|---|---|
| 6,421,709 B1 * | 7/2002 | McCormick et al. | 709/206 |
| 6,480,885 B1 * | 11/2002 | Olivier | 709/207 |
| 2003/0023736 A1 * | 1/2003 | Abkemeier | 709/229 |
| 2003/0182383 A1 * | 9/2003 | He | 709/206 |
| 2004/0019651 A1 * | 1/2004 | Andaker | 709/207 |
| 2004/0210640 A1 * | 10/2004 | Chadwick et al. | 709/207 |

* cited by examiner

*Primary Examiner*—Michael Won
(74) *Attorney, Agent, or Firm*—Duke W. Yee; Jeffrey S. LaBaw; Wayne P. Bailey

(57) ABSTRACT

A method, apparatus, and computer instructions for managing unwanted email messages in a data processing system. An interface is provided for a user to select members of a reviewing group of users. Input is collected from each member of the reviewing group of users as to whether a particular email message is an unwanted email message. A filter is constructed from a collective input of the reviewing group of users for a user. The filter contains input from a set of users of the reviewing group of users, wherein the set of users is selected by the user. Incoming email messages are filtered using the filter. A selected email message identified by one member in the reviewing group of users is unforwarded to the user.

20 Claims, 3 Drawing Sheets

METHOD AND APPARATUS FOR FILTERING SPAM EMAIL

BACKGROUND OF THE INVENTION

1. Technical Field

The present invention relates generally to an improved data processing system and in particular to a method and apparatus for processing electronic mail messages. Still more particularly, the present invention relates generally to a method and apparatus for filtering out unwanted electronic mail messages.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

The Internet also provides a medium for sending electronic mail messages between different users or recipients. These electronic mail messages are also referred to as email messages. With email messages, a user may send a message to one or more recipients almost instantaneously. The use of email messages for communications between different users has become widespread.

With the increasing use of email, some businesses and users use this medium for advertising and other types of solicitations. Often times, this type of email message is unwanted and is referred to as "spam", which also is known as "unsolicited commercial email" (UCE), "unsolicited bulk email" (UBE), "gray mail", and just plain "junk mail". The term "spam" is both a noun (the email message) and a verb (to send it). Spam is often used to advertise products or to broadcast some political or social commentary.

Like viruses, spam has become a scourge on the Internet as hundreds of millions of unwanted messages are transmitted daily to almost every email recipient as well as to newsgroups. In response to spam, programs have been created to filter out this unwanted email. Many Internet service providers (ISPs) have added servers that have no other function than to filter out spam.

These servers include spam filters, which are software that diverts incoming spam. Spam filters also may be installed on a client machine in addition to on a mail server, in which case, the user never receives the spam in the first place. Spam filtering may be configured to trap messages based on a variety of criteria, including sender's email address, specific words in the subject or message body or by the type of attachment that accompanies the message.

Address lists of habitual spammers (blacklists) are maintained by various organizations, ISPs and individuals as well as lists of acceptable addresses (whitelists) that might be misconstrued as spam. Spam filters reject blacklisted messages and accept whitelisted ones. More sophisticated spam filters use artificial intelligence (AI) techniques that look for key words and attempt to decipher their meaning in sentences in order to more effectively analyze the content and not trash a real message.

Although these types of spam filters are useful, these computer implemented algorithms can only go so far in preventing spam from reaching users. Even with these types of filters, some email messages, containing spam, may still reach users. As a result, a user is required to analyze the contents of an email message to determine whether a particular message is unwanted. Even though a user may make such a determination in a few seconds or less with a hundred percent accuracy, having to review email messages for spam missed by filtering software may be time consuming and is undesirable. Therefore, it would be advantageous to have an improved method, apparatus, and computer instructions for filtering out unwanted email messages.

SUMMARY OF THE INVENTION

The present invention provides a method, apparatus, and computer instructions for managing unwanted email messages in a data processing system. An interface is provided for a user to select members of a reviewing group of users. Input is collected from each member of the reviewing group of users to decide whether a particular email message is an unwanted email message. A filter is constructed from a collective input of the reviewing group of users for a user. The filter contains input from a set of users of the reviewing group of users, wherein the set of users is selected by the user. Incoming email messages are filtered using the filter. A selected email message identified by one member in the reviewing group of users is unforwarded to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
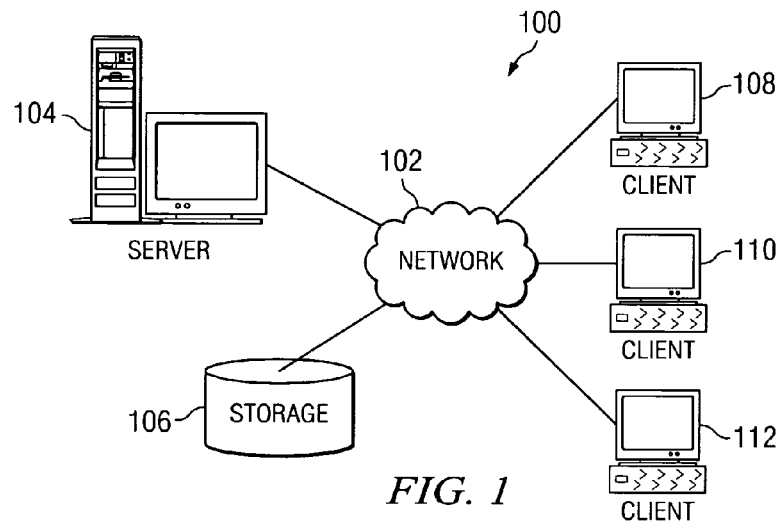
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. In the illustrative examples, server 104 provides email services. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
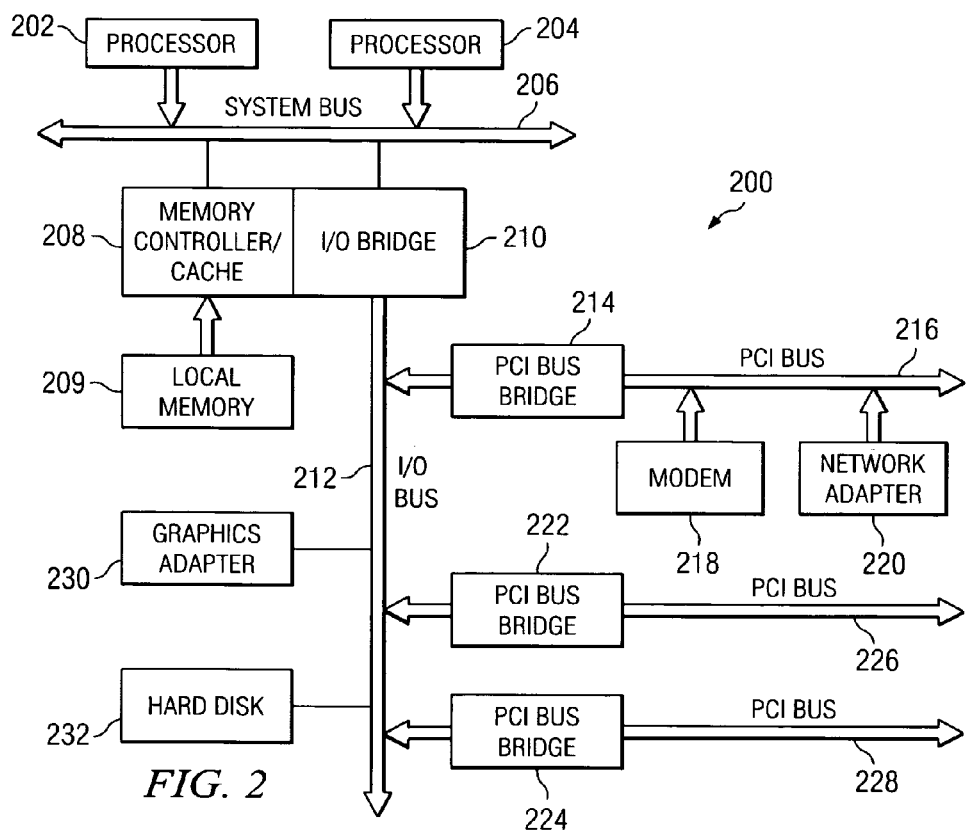
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
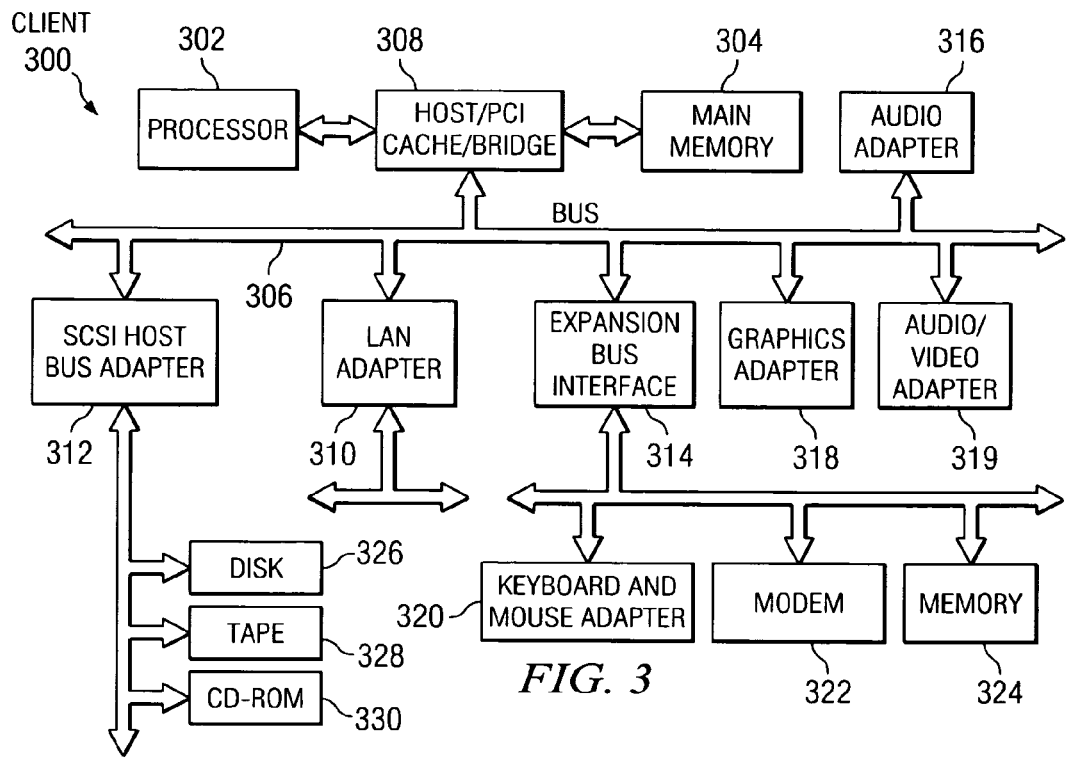
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for filtering out unwanted email messages. The mechanism of the present invention employs a peer group, which contains a portion or all of an email community. Each member of this peer group is registered and shares a spam email database with a service provider. Every person in this group has an ability to flag or identify an email message as an unwanted message or spam. In response to this identification, the text content of the email message is sent and stored in the spam email database. In this manner, other members of the group will not waste time on such an email message. In these examples, each time an inbox for an email account is visited, the mechanism of the present invention uses the spam email database to identify all spam email messages and automatically delete those messages from the user's inbox. An inbox contains a group of email messages that has been received for a user, but has not yet been read.

Each user may construct one or more filters for filtering out unwanted email messages in the illustrative examples. A filter may be customized to contain other users as selected by the user. In this manner, a user may individually select other users who should help decide whether a particular email message is unwanted. Other methods may be used to generate filters for the illustrative embodiments. For example, a filter may be created as a collection of filters created by other users or some combination of filters and selected users. In this manner, the mechanism of the present invention provides for filtering of email messages on a group subscription basis.

Further, the present invention also may provide a synchronization function for email messages in an inbox. When a user requests email messages from an inbox maintained by an email server, the email messages already placed in the inbox may be processed to determine whether any of these email messages are now considered unwanted or spam. An email message may be acceptable when this email message is placed in the inbox for the user. At some later time, this email message may be considered unwanted based on an update from another user. The synchronization function eliminates these types of email messages such that the user does not waste time on them.

Figure 4:
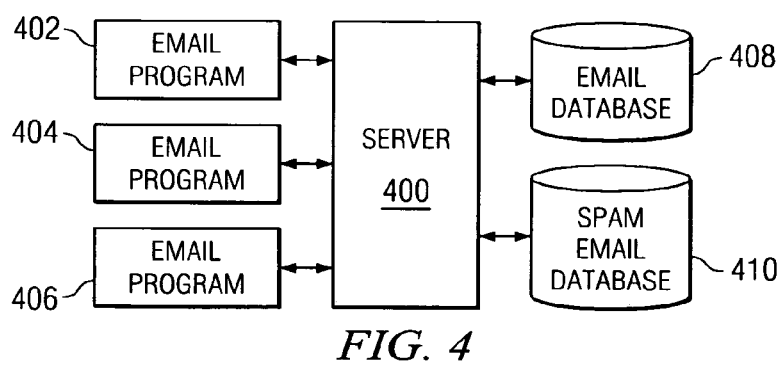
FIG. 4 is a diagram illustrating components used in filtering out unwanted email messages in accordance with a preferred embodiment of the present invention.

Turning now to FIG. 4, a diagram illustrating components used in filtering out unwanted email messages is depicted in accordance with a preferred embodiment of the present invention. As illustrated, server 400 provides email services to client processes, such as email program 402, 404, and 406. Server 400 is a process that may be found on a data processing system such as data processing system 200 in FIG. 2. Email programs 402, 404, and 406 may be found on clients implementing a data processing system, such as data processing system 300 in FIG. 3.

Email messages for different users are stored in email database 408. The text content of messages identified by users as unwanted email messages or spam are stored in spam email database 410. In these examples, the entire message may not be stored in spam email database 410.

Figure 5:
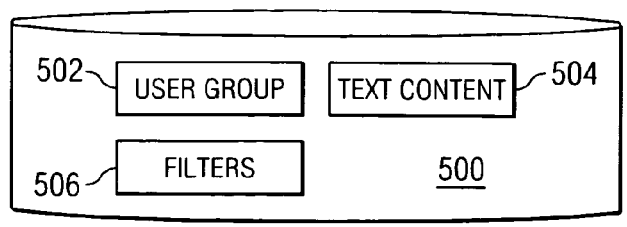
FIG. 5 is a diagram illustrating a spam email database in accordance with a preferred embodiment of the present invention.

With reference now to FIG. 5, a diagram illustrating a spam email database is depicted in accordance with a preferred embodiment of the present invention. Spam email database 500 may be implemented as spam email database 410 in FIG. 4. In this illustrative example, spam email database 500 contains user group 502, text content 504, and filters 506. User group 502 contains all users registered with a service in this example.

Text content 504 contains the content from email messages identified as being unwanted in these examples. Further, this content is associated with users who flagged a particular message as being unwanted. Filters 506 contain filters created by users for filtering out unwanted email messages. Each filter contains an identification of one or more users from user group 502. These identifications are used to select content from text content 504 for use in filtering out unwanted messages. Although filters are stored within spam email database 500 in this example, these filters may be stored elsewhere, such as at a client.

With reference back to FIG. 4, a first user using email program 402 may identify a first email message as being unwanted. The content from this email message is stored in spam email database 410 in association with this first user. A second user. using email program 404 may identify a second email message as being unwanted. The content from this second email message is also stored in spam email database 410 in association with the second user.

A third user at email program 406 constructs a filter by selecting users for the filter. If the third user selects both the first and second user, then email messages, such as the first email message and the second email message will be filtered out and will not reach the third user. These unwanted email messages are removed from the inbox of the third user by server 400 in these examples. If a third user only selects the first user for the filter, then only the first message is filtered out by server 400, while the second message still reaches the third user. Thus, different users may create different filters based on users selected from the user group. Some users may be left out of a filter, while other users are included based on who is trusted with respect to identifying email as being unwanted. For example, a user may select certain users known to have similar preferences and interests because email that may be considered as unwanted by others may be desirable for these users.

Additionally, server 400 may provide a synchronization function for email messages located in inboxes for users. In these examples, the inboxes for the different users may be located in email database 408. In this example, users for email programs 402, 404, and 406 use the same filter. All of the users receive an email message in their inboxes. If a user at email program 402 opens this email message and flags the email message as unwanted, the content of this email message is saved in spam email database 410. At this point in time, the email message in each of the inboxes is considered unwanted based on the update made by the user at email program 402.

Subsequently, when a user at email program 404 requests to see email messages in the user's inbox, the email messages in the inbox associated with email program 404 are synchronized with spam email database 410, including the newly saved comment flagged by the user at email program 402. This synchronization function deletes the email message from the inbox for the user at email program 404. As a result, the user at email program 404 does not have to waste time on this message.

Figure 6:
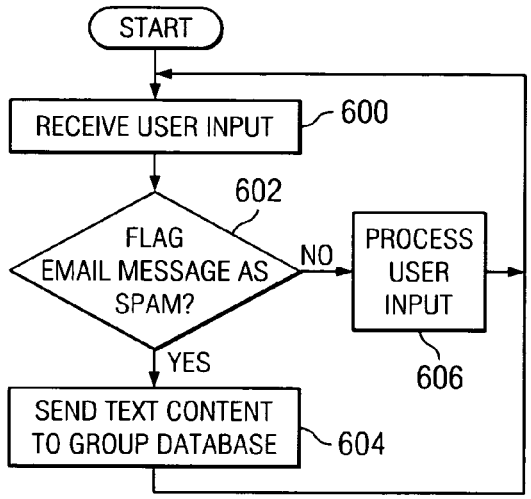
FIG. 6 is a flowchart of a process for identifying unwanted email in accordance with a preferred embodiment of the present invention.

Turning now to FIG. 6, a flowchart of a process for identifying unwanted email is depicted in accordance with a preferred embodiment of the present invention. The process illustrated in FIG. 6 may be implemented in a client process, such as email program 402 in FIG. 4.

The process begins by receiving user input (step 600). In these examples, the user input is received through a graphical user interface provided by the client process. Next, a determination is made as to whether the email message is flagged as spam by the user input (step 602). If the email message is flagged as spam the text content is sent to a group database (step 604) with the process then returning to step 600.

With reference again to step 602, if the email message is not flagged as spam, the user input is processed (step 606) with the process then returning to step 600. In step 606, the user input may be other input, such as accessing email, sending an email message, or creating a filter.

Figure 7:
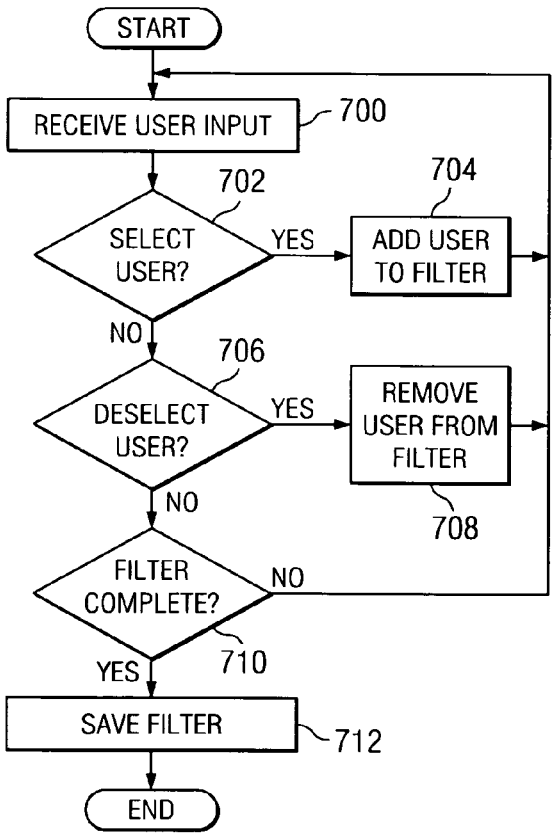
FIG. 7 is a flowchart of a process for creating a filter in accordance with a preferred embodiment of the present invention.

Turning now to FIG. 7, a flowchart of a process for creating a filter is depicted in accordance with a preferred embodiment of the present invention. The process illustrated in FIG. 7 may be implemented in a server process, such as server 400 in FIG. 4.

The process begins by receiving a user input (step 700). Next, a determination is made as to whether the user input selects a user (step 702). If the user input selects the user, the selected user is added to the filter (step 704) with the process then returning to step 700 as described above.

With reference again to step 702 if the user input does not select a user, a determination is made as to whether the user is deselected (step 706). If the user is deselected, the user is removed from the filter (step 708) with the process then returning to step 700. With reference again to step 706, if the user input does not deselect the user, a determination is made as to whether the filter is complete (step 710). If the filter is complete, the filter is saved (step 712) with the process terminating thereafter. Otherwise, the process returns to step 700.

The process in FIG. 7 may be used to edit and modify filters in addition to creating filters. With respect to removing a user from a filter, a specific email box, such as a bulk email box may be used to hold all email messages that have been filtered out as being unwanted or spam. These email messages are associated with users who have identified them as unwanted email messages. A user creating or modifying a filter may examine this bulk email box to see whether email messages are present that the user actually wanted delivered to the inbox. By selecting the email message, the user may identify whose input caused the deletion of this email message. The user may choose to delete the person who had provided the input for the message that the user actually wanted delivered.

Alternatively, the user may place that person on a watch list or construct an exception to the filter. For example, the exception may allow an email message from the particular address or based on particular key words in the email message. In this manner, a filter edited or modified to remove a user whose input is suspect or considered incorrect.

Figure 8:
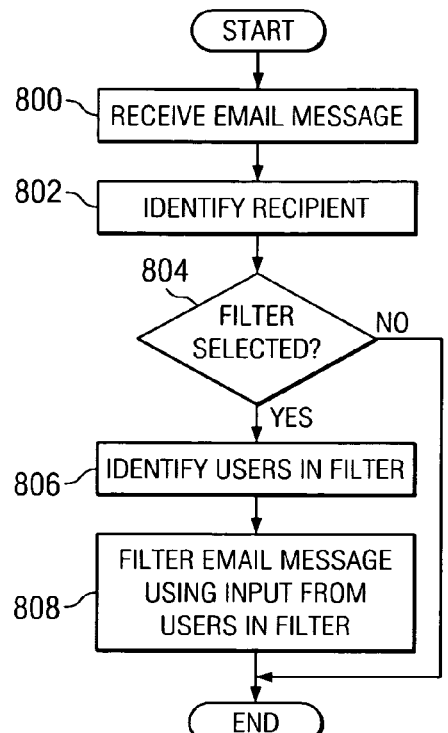
FIG. 8 is a flowchart of a process for filtering an email message in accordance with a preferred embodiment of the present invention.

Turning now to FIG. 8, a flowchart of a process for filtering an email message is depicted in accordance with a preferred embodiment of the present invention. The process illustrated in FIG. 8 may be implemented in a server process, such as server 400 in FIG. 4.

The process begins by receiving an email message (step 800). Next, a recipient is identified (step 802). A determination is made as to whether a filter is selected for the recipient (step 804). If a filter is selected, users are identified in the filter (step 806). These users are those from which input is used to process the received email message in determining whether this message is unwanted. Then, the email message is filtered using input from users in the filter (step 808) with the process terminating thereafter. The content in the email message is compared to the content from messages identified by users as unwanted. If the content is sufficiently similar, the email message also is considered to be unwanted and is filtered out or deleted. The similarity between the content in the email message and the content used by the filter may vary depending on the particular implementation. For example, if a percentage, such as fifty percent or eighty percent, of the content is similar, then the email message may be considered sufficiently similar. Now, referring back to step 804, if a filter is not selected, then the process terminates.

Figure 9:
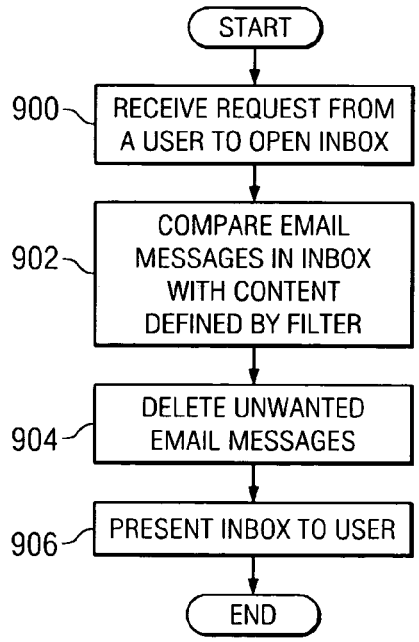
FIG. 9 is a flowchart of a process for synchronizing email messages in accordance with a preferred embodiment of the present invention.

With reference next to FIG. 9, a flowchart of a process for synchronizing email messages is depicted in accordance with a preferred embodiment of the present invention. The process illustrated in FIG. 9 may be implemented in a server, such as server 400 in FIG. 4.

The process begins by receiving a request from a user to open the user's inbox (step 800). In response to this request, email messages in the inbox are compared with the content as defined by the filter selected by the user (step 802). The content in these illustrative examples is content from email messages flagged as unwanted by users selected for the filter. This content may have changed after one or more email messages have been placed in the user's inbox. Thus, this comparison may identify additional unwanted email messages based on updates.

Any email messages identified as being unwanted are deleted from the inbox (step 804). The inbox is then presented to the user (step 806) with the process terminating thereafter.

Thus, the present invention provides an improved method, apparatus, and computer instructions for filtering email messages to remove unwanted messages using a group subscription mechanism. Users within a group may identify certain email messages as being unwanted. The content of these messages is used to filter incoming email messages. Each user may generate one or more filters to filter email. A filter contains an identification of one or more users in the group. The identified users are ones whose input on identifying unwanted email messages is used to filter email.

In this manner, a user may individually select users whose input is used in deciding whether a particular email is unwanted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing unwanted email messages in a data processing system, the method comprising:
    providing an interface for a user to select members of a reviewing group of users;
    collecting input from each member of the reviewing group of users as to whether a particular email message is an unwanted email message;
    constructing a filter from a collective input of the reviewing group of users for the user, wherein the filter contains input from a set of users of the reviewing group of users, wherein the set of users is selected by the user; and
    filtering incoming email messages using the filter, wherein a selected email message identified by one member in the reviewing group of users is unforwarded to the user, wherein each user in the reviewing group of users constructs a personalized filter based on selecting users in the set of users to form a set of filters, wherein each filter in the set of filters (i) contains different users from the reviewing group of users and (ii) is a user filter associated with one of the selected users.

2. The method of claim 1, wherein the interface is provided using a Web page.

3. The method of claim 1, wherein the set of users is one user from the reviewing group of users.

4. The method of claim 1, wherein the set of users is all of the users from in the reviewing group of users.

5. The method of claim 1, wherein at least a portion of the selected email message is stored in a database along with an identifier of the one member in the reviewing group such that the selected email message is associated with the one member in the reviewing group.

6. The method of claim 1, wherein the data processing system is an email server.

7. The method of claim 1 further comprising:
    responsive to the user requesting access to an inbox, synchronizing email messages in the inbox using the filter.

8. A data processing system for managing unwanted email messages, the data comprising:
    providing means for providing an interface for a user to select members of a reviewing group of users;
    collecting means for collecting input from each member of the reviewing group of users as to whether a particular email message is an unwanted email message;
    constructing means for constructing a filter from a collective input of the reviewing group of users for the user, wherein the filter contains input from a set of users of the reviewing group of users, wherein the set of users is selected by the user; and
    filtering means for filtering incoming email messages using the filter, wherein a selected email message identified by one member in the reviewing group of users is unforwarded to the user, wherein each user in the reviewing group of users constructs a personalized filter based on selecting users in the set of users to form a set of filters, wherein each filter in the set of filters (i) contains different users from the reviewing group of users and (ii) is a user filter associated with one of the selected users.

9. The data processing system of claim 8, wherein the interface is provided using a Web page.

10. The data processing system of claim 8, wherein the set of users is one user from the reviewing group of users.

11. The data processing system of claim 8, wherein the set of users is all of the users from in the reviewing group of users.

12. The data processing system of claim 8, wherein at least a portion of the selected email message is stored in a database along with an identifier of the one member in the reviewing group such that the selected email message is associated with the one member in the reviewing group.

13. The data processing system of claim 8, wherein the data processing system is an email server.

14. A data processing system for managing unwanted email messages in a data processing system, the data processing system comprising:
    a bus system;
    a memory connected to the bus system, wherein in the memory includes a set of instructions;
    a communications adaptor connected to the bus system, wherein the communications adaptor sends and receives email messages; and
    a processing unit, wherein the processing unit executes the set of instructions to provide an interface for a user to select members of a reviewing group of users; collect input from each member of the reviewing group of users as to whether a particular email message is an unwanted email message; construct a filter from a collective input of the reviewing group of users for the user, wherein the filter contains input from a set of users of the reviewing group of users, wherein the set of users is selected by the user; and filter incoming email messages using the filter, wherein a selected email message identified by one member in the reviewing group of users is unforwarded to the user, wherein each user in the reviewing group of users constructs a personalized filter based on selecting users in the set of users to form a set of filters, wherein each filter in the set of filters (i) contains different users from the reviewing group of users and (ii) is a user filter associated with one of the selected users.

15. A computer program product tangibly encoded in a computer readable medium for managing unwanted email messages in a data processing system, the computer program product comprising:
    first instructions for providing an interface for a user to select members of a reviewing group of users;
    second instructions for collecting input from each member of the reviewing group of users as to whether a particular email message is an unwanted email message;

third instructions for constructing a filter from a collective input of the reviewing group of users for the user, wherein the filter contains input from a set of users of the reviewing group of users, wherein the set of users is selected by the user; and fourth instructions for filtering incoming email messages using the filter, wherein a selected email message identified by one member in the reviewing group of users is unforwarded to the user, wherein each user in the reviewing group of users constructs a personalized filter based on selecting users in the set of users to form a set of filters, wherein each filter in the set of filters (i) contains different users from the reviewing group of users and (ii) is a user filter associated with one of the selected users.

16. The computer program product of claim 15, wherein the interface is provided using a Web page.

17. The computer program product of claim 15, wherein the set of users is one user from the reviewing group of users.

18. The computer program product of claim 15, wherein the set of users is all of the users from in the reviewing group of users.

19. The computer program product of claim 15, wherein at least a portion of the selected email message is stored in a database along with an identifier of the one member in the reviewing group such that the selected email message is associated with the one member in the reviewing group.

20. The computer program product of claim 15, wherein the data processing system is an email server.

* * * * *